J. L. HEELEY.
Ornamental Chain.

No. 199,542. Patented Jan. 22, 1878.

Witnesses.
Otto Hufeland.
Hugo Brueggemann

Inventor.
James L. Heeley
by
Van Santvoord & Hauff
his attorneys

UNITED STATES PATENT OFFICE.

JAMES L. HEELEY, OF ATTLEBOROUGH FALLS, MASSACHUSETTS, ASSIGNOR TO DAVIDSON BROTHERS, OF NEW YORK, N. Y.

IMPROVEMENT IN ORNAMENTAL CHAINS.

Specification forming part of Letters Patent No. 199,542, dated January 22, 1878; application filed October 5, 1877.

*To all whom it may concern:*

Be it known that I, JAMES L. HEELEY, of Attleborough Falls, in the county of Bristol and State of Massachusetts, have invented a new and useful Improvement in Ornamental Chains, which improvement is fully set forth in the following specification, reference being had to the accompanying drawings, in which—

Figure 1:
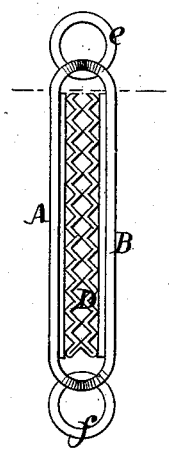
Figure 3:
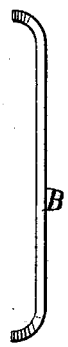
Figure 4:
Figure 2:
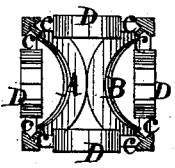
Figure 5:

Figure 1 represents a side view of a link made according to this invention. Fig. 2 is a cross-section thereof. Fig. 3 is a side view of one of the rings or loops of the link detached. Fig. 4 is a side view of a bar used in the construction thereof. Fig. 5 is a cross-section thereof.

Similar letters indicate corresponding parts.

My improvement relates to the construction of links for ornamental chains; and consists in two metallic rings or loops, which are bent toward each other at opposite points, fastened together at such points, and each provided with one or two longitudinal grooves, in combination with filling-pieces the edges of which are inserted in said grooves, so that these filling-pieces are kept in place without the use of solder, while a cheap and handsome link is obtained.

The invention further consists in constructing a metallic bar to form a loop or link for a chain, and providing said bar with two longitudinal grooves, said grooves being situated at angles of ninety degrees (more or less) toward each other, in such manner that each loop or link is adapted to receive two filling-pieces, as hereinafter more fully set forth.

In the drawing, the letters A B designate the two metallic rings or loops of my link, the same being in the example shown made of oblong shape. These loops or rings can be made of any desired metal, and at their opposite ends they are bent or curved toward each other, while they are united at such ends by solder or other suitable means.

I prefer to make said loops or rings A B of a bar having a square shape in cross-section; but said bar may also be round or have any other shape. In two of the sides of the loops or rings A B is formed a longitudinal groove, c, and said rings or loops are put together in such a way that the sides containing these grooves are innermost and face each other.

Said grooves c, moreover, are so made that they are capable of receiving the edges of filling-pieces D in them, the edges of which are inserted in such grooves, so that the spaces within the rings or loops A B, as well as between them, are occupied thereby.

In order to hold said filling-pieces D in place, the rings or loops A B are simply pressed together, and hence no solder is required for this purpose, as heretofore, while at the same time I obtain a link which can be furnished at low cost, and presents a handsome appearance.

The form of the bar of which I make the rings or loops A B is shown in Figs. 4 and 5, the same having a rectilinear form, and having grooves c in two sides thereof. The bar, after being provided with the grooves c, is bent to the desired shape, and fastened together at the ends by solder, or in any suitable way.

The filling-pieces D can obviously be made of various ornamental shapes, or each of such pieces can be divided into two or more parts, spaces being left between each of the parts when they are placed in position.

In some cases the rings or loops A B are provided with a single longitudinal groove, instead of two grooves, two of the four spaces formed by the said rings or loops, when they are put together, being then left vacant.

Through the rings or loops A B are passed two rings, e f, one at each end, by which the whole is connected to two adjacent and corresponding links in a chain.

If desired, the filling-pieces or centers in each of the loops or rings A may be made all in one piece, and in this case said rings are held together by the centers or filling-pieces, and they need not be soldered or otherwise fastened together.

It will be observed that all the parts of the link above described can be finished previously to their being put together, and hence I am enabled to impart to the same the best possible finish.

By providing the bar with two grooves, c c, a chain-link can be formed consisting of two filling-pieces, as specially illustrated in Figs. 2 and 5 of the drawing.

What I claim as new, and desire to secure by Letters Patent, is—

1. A chain-link constructed of two loops or rings, bent toward each other at opposite points, fastened together at such points, and each provided with one or two longitudinal grooves, in combination with filling-pieces the edges of which are inserted in said grooves, substantially in the manner and for the purpose set forth.

2. A metallic bar bent to form a loop or link for a chain, provided with two longitudinal grooves, situated at angles of about ninety degrees toward each other, to receive and sustain in position two filling-pieces, substantially as described.

In testimony that I claim the foregoing I have hereunto set my hand and seal this 26th day of February, 1877.

J. L. HEELEY. [L. S.]

Witnesses:
HENRY A. STREETER,
H. M. DAGGETT, Jr.